US011276423B1

(12) United States Patent
Dobrynin et al.

(10) Patent No.: US 11,276,423 B1
(45) Date of Patent: Mar. 15, 2022

(54) READER WITH A COMPENSATING LAYER (71) Applicant: Seagate Technology LLC, Fremont, CA (US)

(72) Inventors: Alexey Dobrynin, Londonderry (GB); Kevin Anthony McNeill, Londonderry (GB)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/336,927

(22) Filed: Jun. 2, 2021

Related U.S. Application Data (60) Provisional application No. 63/047,339, filed on Jul. 2, 2020.

(51) Int. Cl.
G11B 5/39 (2006.01)
(52) U.S. Cl.
CPC .................................. *G11B 5/3909* (2013.01)
(58) Field of Classification Search
CPC .................................................... G11B 5/3909
See application file for complete search history.

(56) References Cited

U.S. PATENT DOCUMENTS

| 4,012,781 | A | | 3/1977 | Lin | |
|---|---|---|---|---|---|
| 6,005,753 | A | * | 12/1999 | Fontana, Jr | B82Y 25/00 360/324.2 |
| 7,035,062 | B1 | * | 4/2006 | Mao | B82Y 10/00 360/324.2 |
| 7,467,459 | B2 | * | 12/2008 | Gill | B82Y 25/00 257/E43.006 |
| 8,130,475 | B2 | * | 3/2012 | Kawamori | G01R 33/02 360/324.12 |
| 8,369,048 | B2 | * | 2/2013 | Miyauchi | B82Y 25/00 360/319 |
| 8,390,963 | B2 | | 3/2013 | Dimitrov et al. | |
| 8,724,265 | B2 | * | 5/2014 | Qiu | G11B 5/3932 360/324.12 |
| 9,041,391 | B2 | * | 5/2015 | Gao | G01R 33/093 324/252 |
| 9,202,482 | B2 | * | 12/2015 | Le | G11B 5/398 |
| 9,269,383 | B1 | | 2/2016 | Hattori et al. | |
| 9,280,992 | B1 | | 3/2016 | Jiang et al. | |
| 9,390,735 | B1 | * | 7/2016 | Wang | G11B 5/3912 |
| 9,786,305 | B1 | * | 10/2017 | Li | G11B 5/3948 |
| 9,870,790 | B1 | * | 1/2018 | Hassan | G11B 5/398 |
| 10,008,223 | B1 | * | 6/2018 | Dobrynin | G11B 5/398 |
| 10,319,398 | B2 | | 6/2019 | Roy et al. | |
| 10,777,222 | B1 | * | 9/2020 | Liu | G11B 5/4886 |
| 11,087,785 | B1 | * | 8/2021 | Mao | G11B 5/3912 |
| 2011/0228428 | A1 | * | 9/2011 | Dimitrov | G11B 5/3932 360/320 |

(Continued)

FOREIGN PATENT DOCUMENTS

GB      1 536 735 A      12/1978

*Primary Examiner* — Brian E Miller
(74) *Attorney, Agent, or Firm* — Westman, Champlin & Koehler, P.A.

(57) ABSTRACT

A reader includes a bearing surface and a free layer having a front surface and a rear surface. The front surface of the free layer forms a portion of the bearing surface. The reader also includes a compensating layer behind the rear surface of the free layer. The reader further includes a tunnel barrier layer below the free layer.

18 Claims, 7 Drawing Sheets

(56) References Cited

U.S. PATENT DOCUMENTS

| | | | |
|---|---|---|---|
| 2011/0279923 A1* | 11/2011 | Miyauchi | H01F 10/3272 |
| | | | 360/75 |
| 2012/0134057 A1* | 5/2012 | Song | G11B 5/3912 |
| | | | 360/319 |
| 2015/0062751 A1* | 3/2015 | Le | G11B 5/3163 |
| | | | 360/234.3 |
| 2017/0244025 A1 | 8/2017 | Nagashima | |

* cited by examiner

READER WITH A COMPENSATING LAYER

CROSS-REFERENCE TO RELATED APPLICATION

This application claims priority to U.S. provisional application No. 63/047,339, filed on Jul. 2, 2020, the content of which is hereby incorporated by reference in its entirety.

SUMMARY

In one embodiment, a reader is provided. The reader includes a bearing surface and a free layer having a front surface and a rear surface. The front surface of the free layer forms a portion of the bearing surface. The reader also includes a compensating layer behind the rear surface of the free layer. The reader further includes a tunnel barrier layer below the free layer.

In another embodiment, method of making a reader is provided. The method includes forming a tunnel barrier layer, and forming a free layer above the tunnel barrier layer. The free layer has a front surface and a rear surface, with the front surface of the free layer forming a portion of a bearing surface of the reader. The method also includes forming a compensating layer behind the rear surface of the free layer.

In another embodiment, a tunnel magnetoresistive sensor is provided. The tunnel magnetoresistive sensor includes a bearing surface, and a free layer having a front surface and a rear surface. The front surface of the free layer forms a portion of the bearing surface. The tunnel magnetoresistive sensor also includes side shields that bias the free layer. The tunnel magnetoresistive sensor further includes a compensating layer behind the rear surface of the free layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to readers included in data storage devices (e.g., hard disc drive (HDDs), hybrid drives, etc.) that employ a compensating layer (CL) or compensating shield behind a free layer of the reader. Prior to providing details regarding the different embodiments, a description of an illustrative operating environment is provided below.

Figure 1:
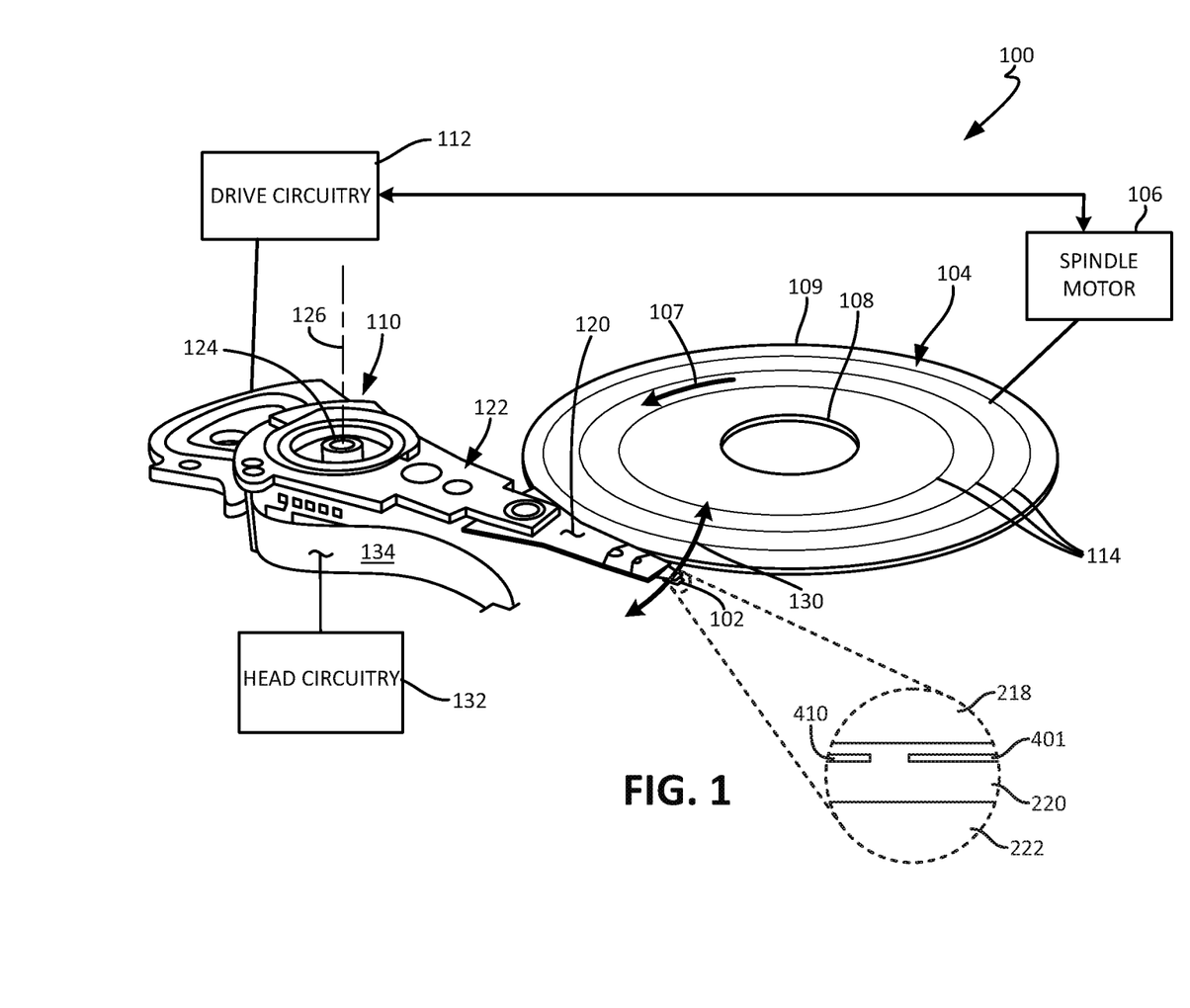
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including a data storage medium and a head for reading data from and/or writing data to the data storage medium. Data storage device 100 may be characterized as a hard disc drive (HDD). In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
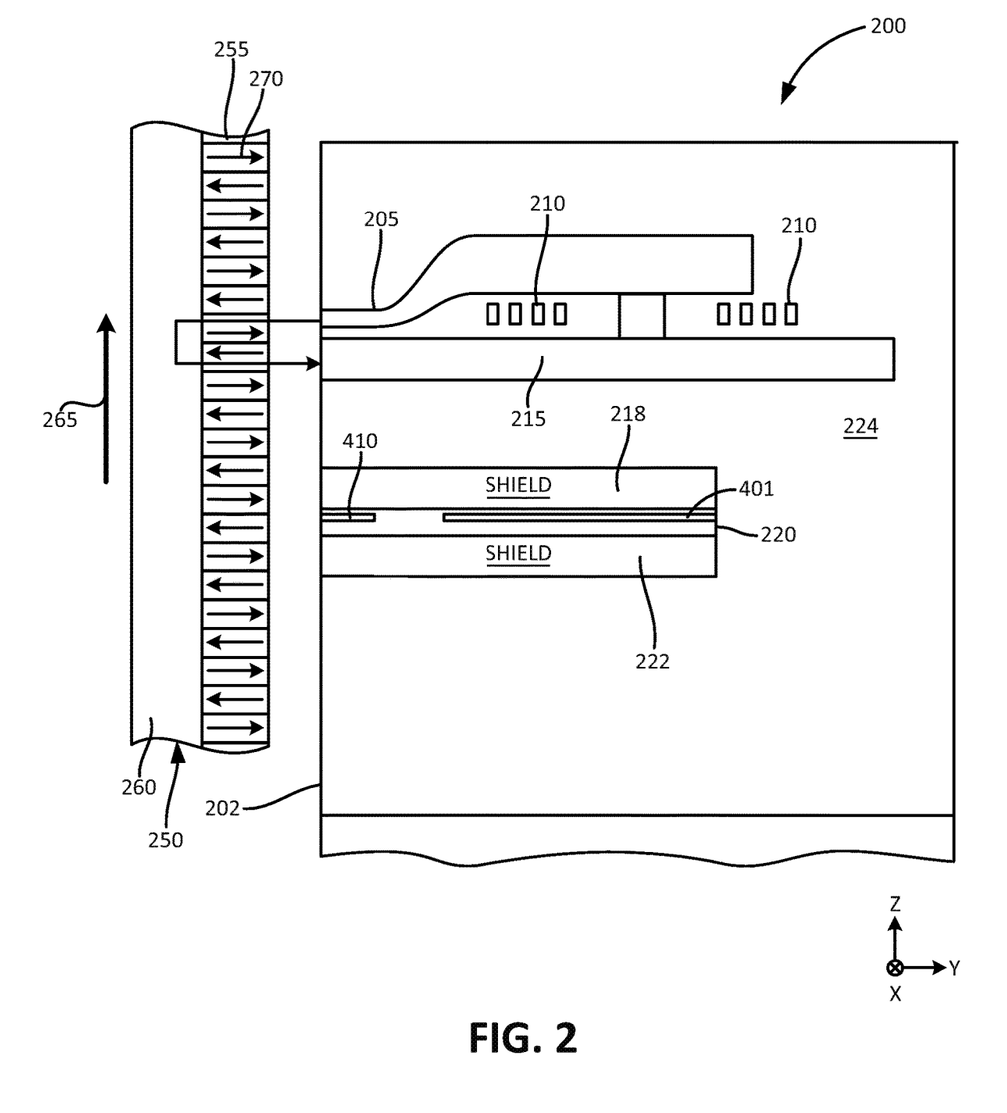
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Layers of recording head 200 may be stacked along a track direction (e.g., a Z-direction in FIG. 2). A track width direction is perpendicular to the track direction (e.g., a cross-track direction, which is an X-direction in FIG. 2). A Y-direction in FIG. 2 is then defined as a direction that is perpendicular to X and Z simultaneously, which is a stripe-height direction. Recording head 200 includes a write pole 205, a magnetization coil 210, a return pole 215, a top shield 218, a read transducer or reader 220, a bottom shield 222, and a wafer overcoat 224.

Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
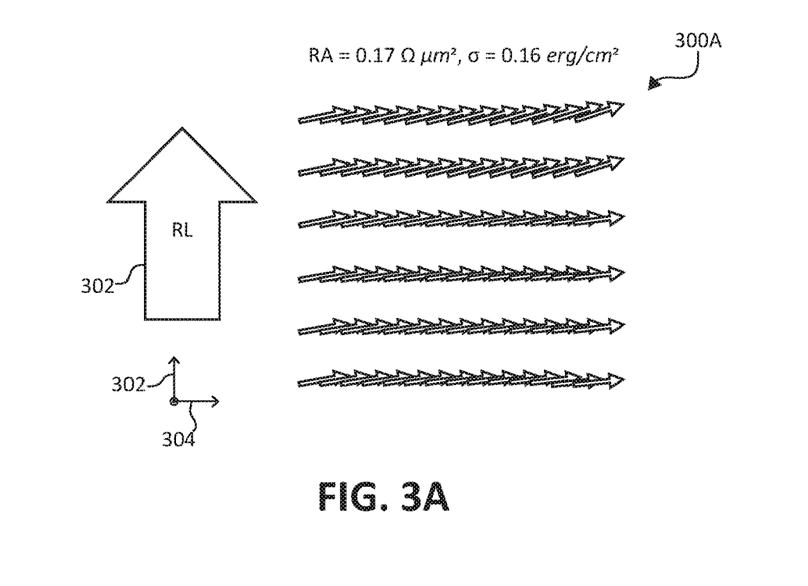
FIG. 3A shows a free layer vector magnetization plot for low resistance-area (RA) product values in a tunnel magnetoresistance reader.

Increase of HDD areal density capability (ADC) leads to a reduction of the HDD reader (such as 220 of FIG. 2) size, resulting in higher electronic noise due to increased reader's resistance, and thus to the degradation of the reader's signal-to-noise (SNR) ratio. Reduction of resistance-area (RA) product in tunnel magnetoresistnce (TMR) readers (described below in connection with FIGS. 4A and 4B) is a way to compensate the size reduction related SNR losses. However, low RA tunnel barriers result in higher exchange coupling between a reference layer (RL) of the reader and a free layer (FL) of the reader through a thin tunneling barrier. FIG. 3 shows zero applied field vector magnetization plots, obtained by micromagnetic modelling for readers with a low RA value of 0.17 $\Omega\mu m^2$ with corresponding RL-FL exchange coupling energy density of 0.16 erg/cm$^2$ (FIG. 3A) and higher RA of 0.5 $\Omega\mu m^2$/FL-RL coupling 0.04 erg/cm$^2$ (FIG. 3B).

Figure 3B:
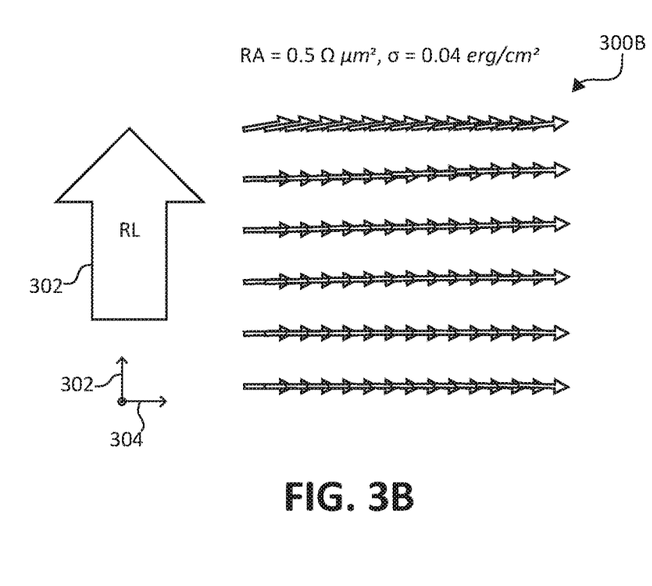
FIG. 3B show a free layer vector magnetization plot for normal/usual RA product values in a tunnel magnetoresistance reader.

From FIGS. 3A and 3B, it is seen that in case of low RA/higher RL-FL coupling the FL magnetization 300A at zero external field is canted (or tilted) towards the RL magnetization direction 302, while in case of higher RA/lower RL-FL coupling the FL magnetization 300B is better aligned along its nominal direction 304 (perpendicular to RL magnetization direction 302). This FL canting (shown in FIG. 3A) leads to increased asymmetry and reduced amplitude of a transfer curve (a voltage versus field curve used to characterize a reader), as well as to inflated linear resolution (pulse width 50 (PW50)).

Figures 4A, 4B, 4C:
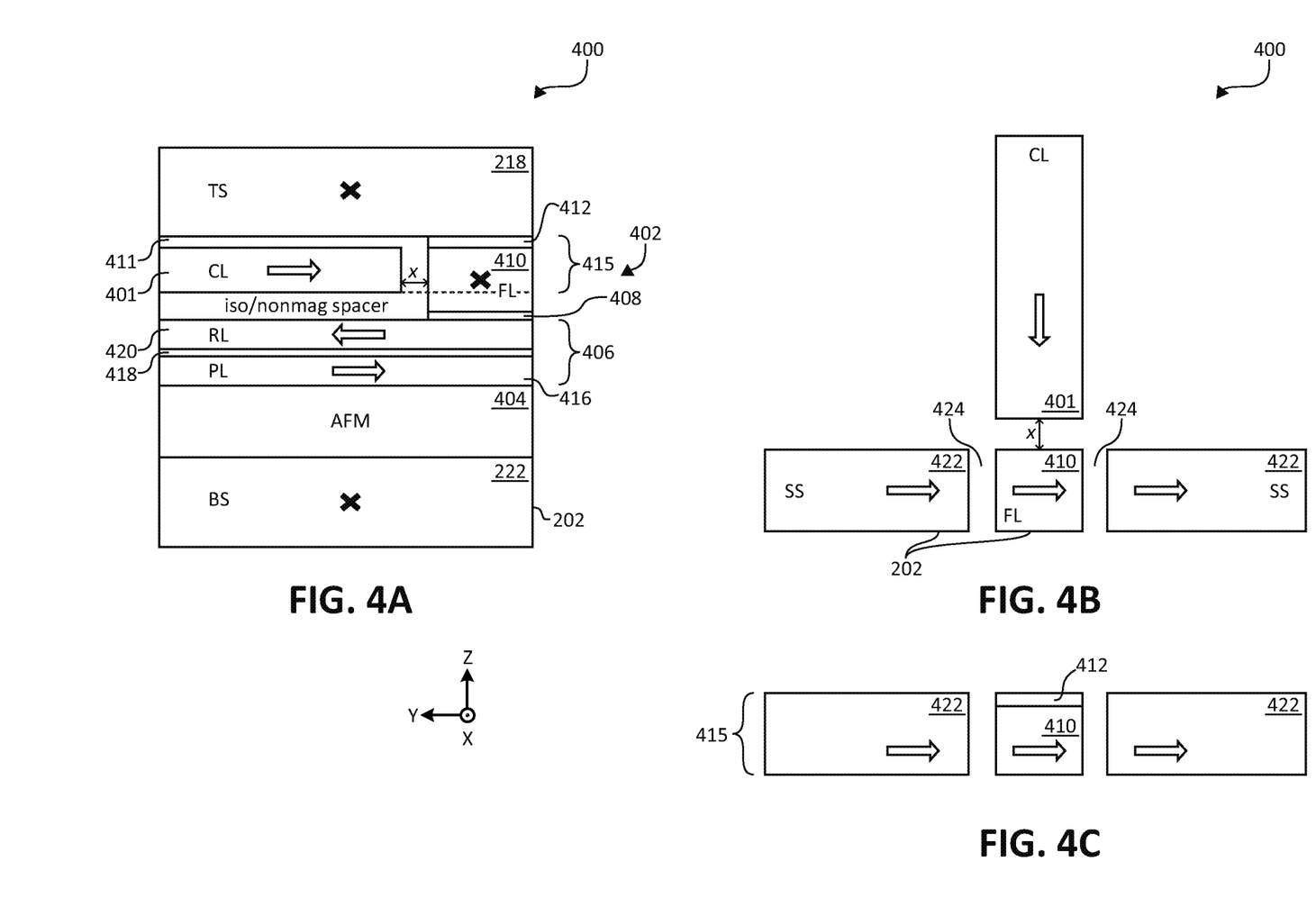
FIGS. 4A and 4B illustrates side and top cross-sectional views, respectively, of a reader with a compensating layer in accordance with one embodiment.
FIG. 4C illustrates a front or bearing surface view of a portion of the reader of FIGS. 4A and 4B.

To address the above-noted problem a compensating shield or CL is included behind the free layer. The CL is magnetized in the direction towards the ABS, as shown in FIGS. 4A and 4B. The CL is denoted by reference numeral 401 in FIGS. 4A and 4B. Different arrows within magnetic layers shown in FIGS. 4A and 4B represent magnetization directions. FIG. 4A shows a read head or reader 400 cross-section in a Y (horizontal)-Z (vertical) plane. FIG. 4B shows the reader 400 cross-section in a X (horizontal)-Y (vertical) plane at Z corresponding to the center of the FL (only magnetic layers are shown). As in the case of FIG. 2, in FIGS. 4A and 4B, X is a cross-track direction and Z is a down-track direction.

In FIGS. 4A and 4B, a bearing surface (for example, ABS) of reader 400 is denoted by reference numeral 202. Read head 400 includes a magnetoresistive sensor 402 that is positioned between top shield (TS) 218 and bottom shield (BS) 222. TS 218 and BS 222, which may be made of a material having high magnetic permeability, reduce or substantially block extraneous magnetic fields, such as, for example, those from adjacent bits on data discs from impacting the magnetoresistive sensor 402, thus improving the performance of the magnetoresistive sensor 402. In one implementation, the TS 218 and BS 222 permit magnetic fields from the bit directly under magnetoresistive sensor 402 to affect the magnetoresistive sensor 402, and thus be read. An antiferromagnetic (AFM) layer 404 is located above the bottom shield.

The magnetoresistive sensor 402 includes a plurality of stacked layers including a synthetic antiferromagnetic (SAF) structure 406, a spacer layer (e.g., tunnel barrier) 408, a FL 410, and a FL cap 412.

In the embodiment shown in FIG. 4A, the sensor SAF structure 406 includes a pinned layer (PL) 416 a thin separation layer 418, which may comprise a metal such as ruthenium (Ru) in some embodiments, and a RL 420. The magnetic moments of each of the PL 416 and the RL 420 are not allowed to rotate under magnetic fields in the range of interest (for example, magnetic fields generated by the bits of data stored on the data discs). The magnetic moments of the RL 420 and the PL 416 are generally oriented normal to the ABS 202 (e.g., in the y direction) and anti-parallel to each other. The separation of the PL 416 and the RL 420 by the thin non-magnetic metallic spacer 418, provides antiferromagnetic Ruderman-Kittel-Kasuya-Yosida (RKKY) exchange coupling between the layers 416 and 420. As indicated above, the RL 420 of the SAF structure 406 and the FL 410 are separated by a tunnel barrier 408.

As can be seen in FIGS. 4A and 4B, x is a distance between the CL 401 and a back of the FL 410. Distance x controls a compensation field from the CL 401 on the FL 410. CL 401 is isolated from the RL 420, the FL 410, and the TS 218 by a non-magnetic isolating layer 411. FL cap 412 may be a non-magnetic metallic layer.

In the embodiment of FIGS. 4A and 4B, the CL 401 has a width (in the cross-track direction) equal to that of the FL 410, and a thickness (in a down-track direction) equal to that of a thickness of side shields (SSs) 422 minus a thickness of the FL cap 412. In FIG. 4A, the SS 422 thickness is denoted by reference numeral 415. FIG. 4C illustrates a front or bearing surface view of a portion of the reader of FIGS. 4A and 4B, and shows the SS 422 thickness 415. As can be seen in FIGS. 4A and 4B, in a direction perpendicular to the ABS 202, the CL 401 starts at a distance equal to the FL's 410 stripe height plus x, and goes all the way to the end of the PL 416/the RL 420 (SAF 406), BS 222 and TS 218. This provides a strong shape anisotropy, with a demagnetizing factor close to 1, e.g., a field of the order of Ms (saturation magnetization) (1T in the case of permalloy) would be needed to reverse it in the opposite direction, thus eliminating the need for extra pinning of CL 401 after initial alignment by applying a high magnetic field in the desired direction. The distance between the front of the CL 401 and the back of the FL 410 (distance x) is a parameter that can be used to adjust the strength of the compensating field as defined by the FL 410-RL 420 coupling strength. The influence of the magnetization of the CL 401 decreases as x increases.

The magnetic moment of the FL 410 is free to rotate under the influence of an applied magnetic field in a range of interest. As indicated above, the read head 400 includes SSs 422, which produce a magnetic field that biases the FL 410 with a magnetic moment parallel to the ABS 202 and generally oriented horizontally. This bias prevents the magnetic moment of the FL 410 from drifting due to, for example, thermal energy, which may introduce noise into the data sensed by the read head 400. The bias is sufficiently small, however, that the magnetic moment of the FL 410 can change in response to an applied magnetic field, such as a magnetic field of a data bit stored on the data discs. The magnetoresistive sensor 402 is separated and electrically isolated from the SSs 422 by an isolation layer 424 including, for example, insulating materials.

As indicated above, sensor 402 may utilize TMR effects. The tunneling barrier layer 408 is sufficiently thin that quantum mechanical electron tunneling occurs between RL 420 in the SAF structure 406 and the FL 410. The electron tunneling is electron-spin dependent, making the magnetic response of the magnetoresistive sensor 402 a function of the relative orientations and spin polarizations of the SAF structure 406 and the FL 410. The highest probability of electron tunneling occurs when the magnetic moments of the SAF structure 406 and the FL 410 are parallel, and the lowest probability of electron tunneling occurs when the magnetic moments of the SAF structure 406 and the FL 410 are anti-parallel. Accordingly, the electrical resistance of the magnetoresistive sensor 402 changes in response to an applied magnetic field. The data bits on the data discs in the disc drive may be magnetized in a direction normal to the ABS 202, either pointing towards the ABS 202 or away from the ABS 202. Thus, when the magnetoresistive sensor 402 passes over a data bit, the magnetic moment of the FL 410 is rotated either towards the ABS 202 or away from the ABS 202, changing the electrical resistance of the magnetoresistive sensor 402. The value of the bit being sensed by the magnetoresistive sensor 402 (for example, either 1 or 0) may therefore be determined based on the current flowing from a first electrode (not shown) to a second electrode (not shown) connected to the magnetoresistive sensor 402.

Figure 5A:
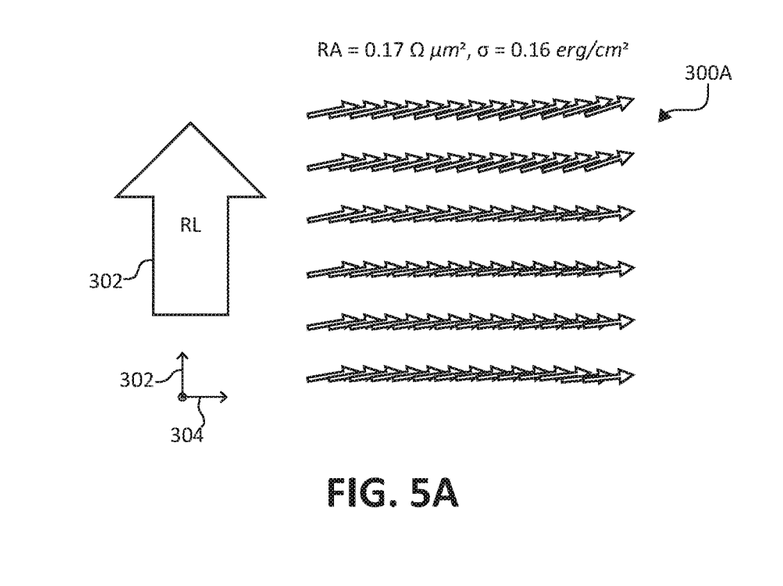
FIG. 5A shows a zero field vector magnetization plot for a low RA reader without a compensating layer.
Figure 5B:
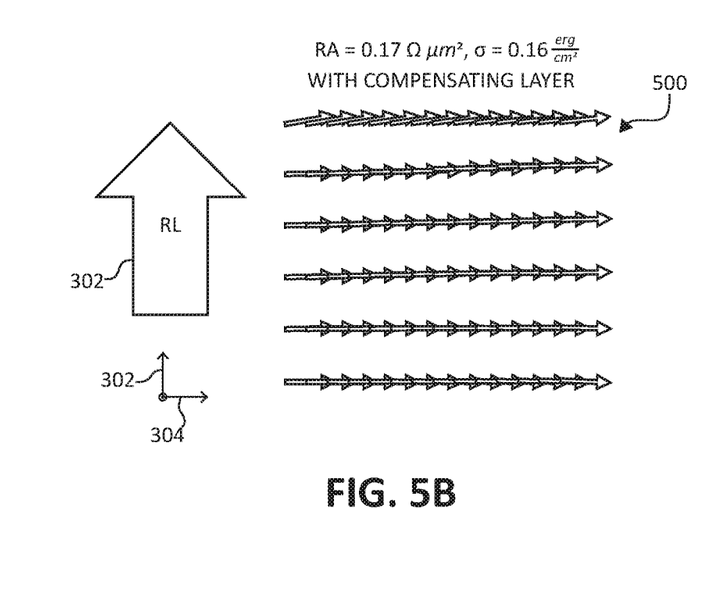
FIG. 5B shows a zero field vector magnetization plots for a low RA reader with a compensating layer.

FIG. 5A shows a zero field vector magnetization plot for a low RA reader without a CL. FIG. 5B shows a zero field vector magnetization plots for a low RA reader with a CL, placed at x=5 nanometers (nm) from the back of the free layer. It can be seen that the right hand side FL magnetization 500 is much better aligned along the cross-track (horizontal) direction 304 than the left hand side FL magnetization 300A, which is canted towards the RL magnetization direction 302.

Figure 6A:
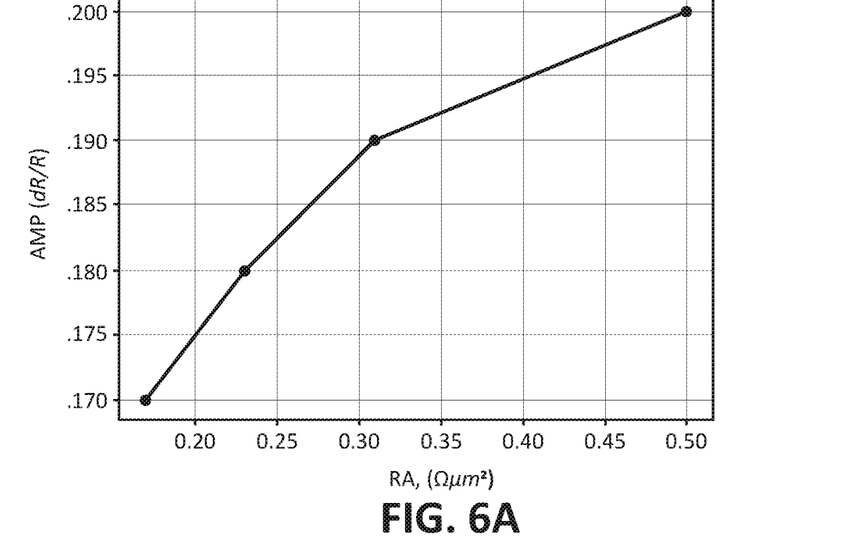
FIG. 6A shows a graph of modelled amplitude of a normal/standard reader as a function of RA and amplitude of a low RA reader with a compensating layer.
Figure 6B:
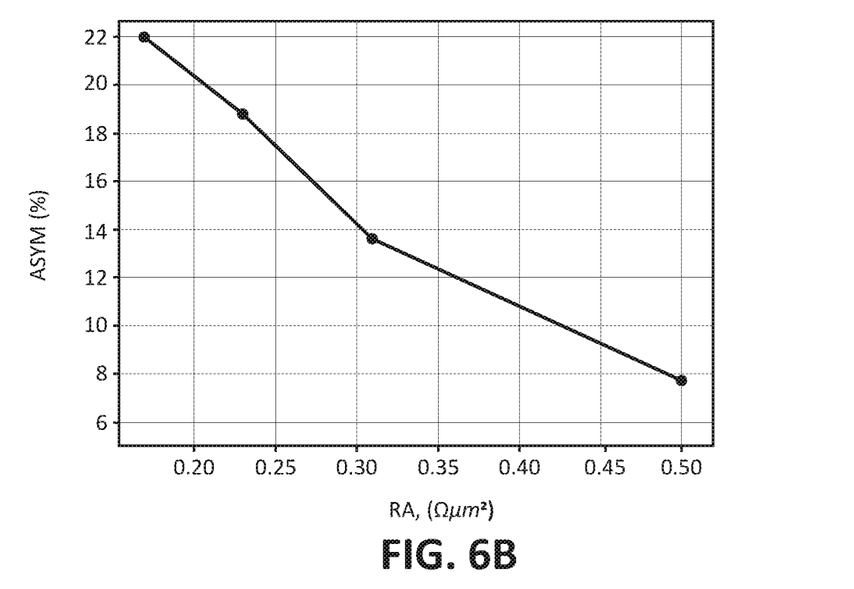
FIG. 6B shows a graph of asymmetry of a normal/standard reader as a function of RA and asymmetry of a low RA reader with a compensating layer.
Figure 7:
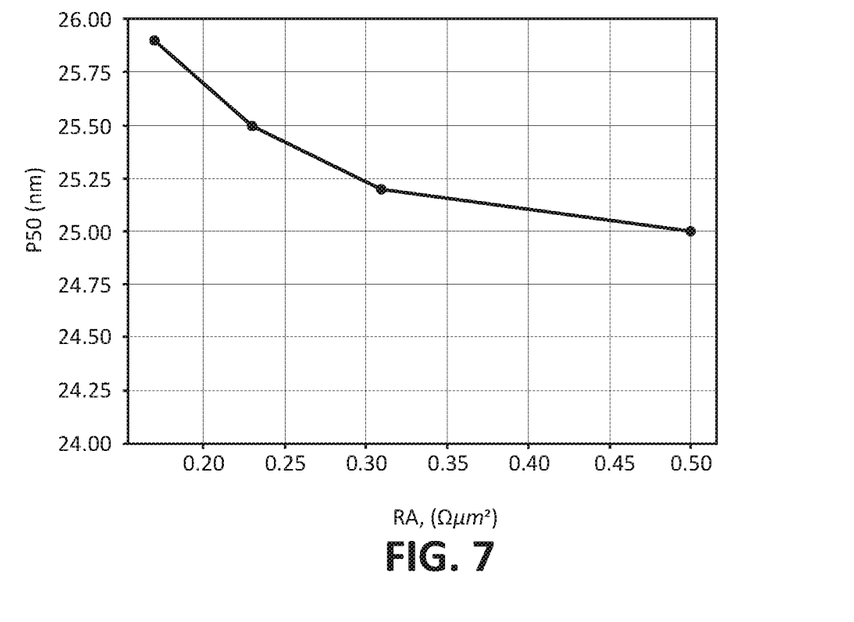
FIG. 7 is a graph of modelled pulse width 50 (PW50) of a standard reader as a function of RA, and PW50 of a low RA reader with a compensating layer.

Plots for transfer curve amplitude (AMP), asymmetry (ASYM), and PW50 (characterizing the reader's linear resolution) are shown in FIGS. 6A-7. FIG. 6A shows a graph of modelled amplitude of a normal/standard reader as a function of RA and amplitude of a low RA reader with a CL. FIG. 6B shows a graph of asymmetry of a normal/standard reader as a function of RA and asymmetry of a low RA reader with a CL. FIG. 7 is a graph of modelled PW50 of a standard reader as a function of RA, and PW50 of a low RA reader with a CL.

The experimental values of the FL-RL exchange coupling energy density (a) for different RA values are summarized in Table 1 below.

TABLE 1

Table 1
RA values, and corresponding FL-RL
exchange coupling energy density values.

| RA, Ω μm² | 0.17 | 0.23 | 0.31 | 0.35 | 0.5 |
|---|---|---|---|---|---|
| σ, erg/cm² | 0.16 | 0.14 | 0.12 | 0.11 | 0.04 |

Table 1: RA Values, and Corresponding FL-RL Exchange Coupling Energy Density Values.

In FIGS. 6 and 7, solid lines show dependencies of a standard reader's parameters versus RA, and stars are those values for the low RA reader stabilized by CL. From the AMP versus RA dependence (FIG. 6A), it is seen that the amplitude drops by 15% when changing RA from 0.5 Ωμm² to 0.17 Ωμm². Adding CL to the reader (FIG. 6B) helps reduce this loss by 10%, ending up at the same AMP value as that for the standard reader at RA about 0.3 Ωμm². ASYM and PW50 for the standard reader degrade by about 15% and about 1 nm correspondingly when moving from high to low RA values. However, adding CL to the low RA reader not only mitigates these losses, but also improves the ASYM and PW50 values as compared to the high RA case.

SNR due to magnetic noise has been modelled, and a decrease of 0.6 decibels (dB) was observed between 0.5 Ωμm² and 0.17 Ωμm² RA values. When adding a CL to the low RA reader, the gain of 0.5 dB was obtained, e.g., the magnetic noise SNR has been compensated by the CL as well. While the distance between CL and FL is the main parameter controlling the CL field, magnetization of the CL can be changed for these purposes as well. Furthermore, if in some cases a non-uniform compensating field may be required, more complex CL geometries, creating the non-uniform field pattern, may be employed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reader comprising:
   a bearing surface;
   a free layer having a front surface and a rear surface, with the front surface of the free layer forming a portion of the bearing surface;
   a magnetic compensating layer magnetized in a predetermined direction and positioned behind the rear surface of the free layer;
   a tunnel barrier layer below the free layer;
   a synthetic antiferromagnetic (SAF) structure below the tunnel barrier layer, the SAF structure comprising a pinned layer and a reference layer above the pinned layer, wherein the reference layer is in contact with the tunnel barrier layer and has a magnetization direction that is opposite to a magnetization direction of the pinned layer; and
   a non-magnetic isolating layer between the magnetic compensating layer and the SAF structure and between the magnetic compensating layer and a top shield above the magnetic compensating layer.

2. The reader of claim 1 and wherein a front surface of the magnetic compensating layer is at a predetermined separation distance from the rear surface of the free layer.

3. The reader of claim 2 wherein a stripe height of the magnetic compensating layer is equal to a stripe height of the SAF structure minus a stripe height of the free layer and minus the predetermined separation distance between the rear surface of the free layer and the front surface of the magnetic compensating layer.

4. The reader of claim 1 and further comprising a cap layer above the free layer, and wherein the free layer is in contact with the tunnel barrier layer and the a cap layer.

5. The reader of claim 1 and further comprising side shields that bias the free layer such that the free layer has a nominal magnetization direction that is parallel to the bearing surface.

6. The reader of claim 5 and wherein the magnetic compensating layer comprises a magnetization direction that is perpendicular to the nominal magnetization direction of the free layer.

7. The reader of claim 5 and wherein a thickness of the magnetic compensating layer is equal to a thickness of the side shields minus a thickness of a cap layer that is above the free layer and in contact with the free layer.

8. The reader of claim 1 and wherein a width of the magnetic compensating layer is equal to a width of the free layer.

9. A method of making a reader, the method comprising:
   forming a synthetic antiferromagnetic (SAF) structure comprising a pinned layer and a reference layer above the pinned layer, wherein the reference layer has a magnetization direction that is opposite to a magnetization direction of the pinned layer;
   forming a tunnel barrier layer above the SAF structure such that the tunnel barrier layer is in contact with the reference layer of the SAF structure;
   forming a free layer above the tunnel barrier layer, the free layer having a front surface and a rear surface, with the front surface of the free layer forming a portion of a bearing surface of the reader;
   forming a magnetic compensating layer behind the rear surface of the free layer and above the SAF structure, wherein the magnetic compensating layer is magnetized in a predetermined direction, and wherein the magnetic compensating layer is separated from the SAF structure and from a top shield above the magnetic compensating layer by a non-magnetic isolating layer.

10. The method of claim 9 and wherein the magnetic compensating layer is formed such that a front surface of the magnetic compensating layer is at a predetermined separation distance from the rear surface of the free layer.

11. The method of claim 10 and wherein the magnetic compensating layer is formed such that a stripe height of the magnetic compensating layer is equal to a stripe height of the SAF structure minus a stripe height of the free layer and minus the predetermined separation distance from the rear surface of the free layer and the front surface of the magnetic compensating layer.

12. The method of claim 9 and further comprising forming a cap layer above the free layer.

13. The method of claim 9 and further comprising forming side shields that bias the free layer such that the free layer has a nominal magnetization direction that is parallel to the bearing surface.

14. The method of claim 13 and wherein the magnetic compensating layer comprises a magnetization direction that is perpendicular to the nominal magnetization direction of the free layer.

15. The method of claim 13 and wherein the magnetic compensating layer is formed with a thickness that is equal to a thickness of the side shields minus a thickness of a cap layer that is above the free layer and in contact with the free layer.

16. The method of claim 9 and wherein the free layer and the magnetic compensating layer are formed such that a width of the magnetic compensating layer is equal to a width of the free layer.

17. A tunnel magnetoresistive sensor comprising:
a bearing surface;
a free layer having a front surface and a rear surface, with the front surface of the free layer forming a portion of the bearing surface;
side shields that bias the free layer such that the free layer has a nominal magnetization direction that is parallel to the bearing surface;
a magnetic compensating layer behind the rear surface of the free layer, the magnetic compensating layer comprising a magnetic direction that is perpendicular to the nominal magnetic direction of the free layer; and
a non-magnetic isolating layer between the magnetic compensating layer and a synthetic antiferromagnetic (SAF) structure below the magnetic compensating layer and between the magnetic compensating layer and a top shield above the magnetic compensating layer.

18. The tunnel magnetoresistive sensor of claim 17 and further comprising a tunnel barrier layer below the free layer.

\* \* \* \* \*

UNITED STATES PATENT AND TRADEMARK OFFICE
CERTIFICATE OF CORRECTION

PATENT NO. : 11,276,423 B1
APPLICATION NO. : 17/336927
DATED : March 15, 2022
INVENTOR(S) : Alexey Dobrynin et al.

It is certified that error appears in the above-identified patent and that said Letters Patent is hereby corrected as shown below:

On the Title Page

Item (72), Line 6, please replace the word "Londonderry" with the word --Derry--.

Item (72), Line 7, please replace the word "Londonderry" with the word --Derry--.

In the Claims

Column 10, Claim 17, Line 9, please replace the word "magnetic" with the word --magnetization--.

Column 10, Claim 17, Line 10, please replace the word "magnetic" with the word --magnetization--.

Signed and Sealed this
Sixth Day of December, 2022

Katherine Kelly Vidal
*Director of the United States Patent and Trademark Office*